United States Patent [19]

Willyoung

[11] 4,223,529
[45] Sep. 23, 1980

[54] COMBINED CYCLE POWER PLANT WITH PRESSURIZED FLUIDIZED BED COMBUSTOR

[75] Inventor: David M. Willyoung, Scotia, N.Y.

[73] Assignee: General Electric Company, Schenectady, N.Y.

[21] Appl. No.: 63,469

[22] Filed: Aug. 3, 1979

[51] Int. Cl.³ .................... F01K 23/06; F01K 23/08
[52] U.S. Cl. .............................. 60/39.18 A; 60/655; 122/4 D
[58] Field of Search ............... 60/39.18 R, 39.18 A, 60/650, 655, 682; 122/4 D

[56] References Cited

U.S. PATENT DOCUMENTS

| | | | |
|---|---|---|---|
| 2,471,755 | 5/1949 | Karrer | 60/655 |
| 3,127,744 | 4/1964 | Nettel | 60/39.18 B |
| 3,687,115 | 8/1972 | Bell | 122/4 D |
| 3,791,137 | 2/1974 | Jubb et al. | 60/39.18 R |
| 3,863,606 | 2/1975 | Bryers et al. | 122/4 D |
| 3,871,172 | 3/1975 | Villiers-Fisher et al. | 60/39.18 A X |
| 4,116,005 | 9/1978 | Willyoung | 60/655 |

FOREIGN PATENT DOCUMENTS

626261  8/1961  Canada .................... 60/39.18 R

OTHER PUBLICATIONS

NASA-CR 134949, p. 14.
Electric World, Dec. 15, 1976, pp. 39-41.

*Primary Examiner*—James J. Gill
*Attorney, Agent, or Firm*—John F. Ahern; Ormand R. Austin

[57] ABSTRACT

An improved combined cycle gas turbine and steam turbine power plant is disclosed in which the energy source for both the steam turbine portion of the system and the gas turbine portion is a pressurized fluidized bed combustor fueled by a carbonaceous fuel such as coal. Combustion gas discharged from the pressurized combustor is processed for minimal cleanup and temperature conditioning prior to passage through a heat exchanger to heat a stream of pressurized air for driving an air-gas turbine. Following the loss of sensible heat energy through the heat exchanger, the lower temperature combustion gas is expanded through a second, combustion gas turbine so that a portion of the remaining energy is extracted at a lower temperature, avoiding problems of hot gas corrosion and fouling within the turbine. A compressor, driven by one or both gas turbines, provides both the pressurized air supply for fluidization of the bed and the stream of air to the air-gas turbine. The fluidized bed contains fuel and sulfur-sorbing particles, the latter capturing and retaining sulfur oxide compounds to prevent emission thereof to the atmosphere. Heat exchangers located within the fluidized bed combustor serve as steam generating means for the steam turbine portion of the power plant.

9 Claims, 3 Drawing Figures

COMBINED CYCLE POWER PLANT WITH PRESSURIZED FLUIDIZED BED COMBUSTOR

This invention relates to a combined steam turbine and gas turbine power plant for generating electric power. More specifically, it concerns a combined cycle power plant wherein a carbonaceous fuel such as sulfur-bearing coal is burned in a pressurized fluidized bed combustor to provide the heat energy for driving thermodynamically coupled steam and gas turbines.

BACKGROUND OF THE INVENTION

It is well known to thermodynamically couple a Brayton-cycle gas turbine with a Rankine-cycle steam turbine to achieve a higher overall power plant efficiency than is obtainable for either cycle working alone (operating in the same range of working fluid temperatures and pressures). Thermal energy which would be rejected from a simple cycle Brayton gas turbine plant and lost is utilized in combined cycle configurations to heat feedwater or steam for the Rankine-cycle steam turbine and thus achieve more power generation for a given calorific input. The higher efficiency reduces fuel requirements, costs, and the quantity of undesirable effluents from the discharge of combustion products to the environment. Since most fuels for combustion power plants come from depletable fossil reserves, higher efficiencies are also desired for conservation.

One limitation on the use of integrated, high-efficiency combined cycle plants, however, results from the purity requirements of the hot gases passing through the gas turbines to avoid hot corrosion, fouling, and rapid deterioration of turbine parts. To avoid these problems, there has been a reliance on combustion of "clean fuels" such as natural gas or refined or specially treated petroleum fuels, which, unfortunately are becoming less competitive in availability and price.

Various suggestions have been made to obtain the benefits of using a fuel such as coal as the source of energy in a combined steam and gas turbine power plant since, in areas such as the United States, indigenous coal reserves are much larger than those of oil or natural gas. In one such power plant proposal, provision is made for burning coal in a pressurized fluidized bed and taking the hot combustion gas off as motive fluid to the gas turbine. Although quite efficient, this scheme necessitates a costly hot gas cleanup system and special cladding of the gas turbine hot gas path parts to prevent corrosion. To the extent that these measures are deficient or of limited life, overall power plant reliability and availability are reduced.

Willyoung, in U.S. Pat. No. 4,116,005, has disclosed one means by which sulfur-bearing coal may be burned in a fluidized bed combustor in an environmentally acceptable manner and in a way that avoids gas turbine reliability problems due to hot gas corrosion and fouling. There is taught the use of a fluidized bed combustor wherein particulate coal is burned under nearly atmospheric pressure conditions and in the presence of sulfur-sorbing particles to control emissions of sulfur oxide compounds. A stream of clean pressurized air serves as motive fluid for the gas turbine, gaining heat energy from the fluidized bed via an in-combustor heat exchanger through which the air stream passes. Steam for the steam turbine is generated also by in-combustor heat exchangers with the combination thus providing a power plant of high efficiency and capable of utilizing the energy of coal combustion in an environmentally acceptable manner without costly cleanup.

While the atmospheric fluidized bed combustor for combined cycle power plants is obviously highly advantageous in that corrosive combustion products do not pass through the gas turbine, certain limitations have nevertheless been recognized and improvements sought therefore. One limitation has been the operating temperature of the fluidized bed. To maintain the effectiveness of the sulfur-sorbing particles in removing sulfur oxides it has been necessary to keep the temperature of the bed in which the particles reside at a temperature lower than the state-of-the-art turbine inlet temperature capabilities of a modern gas turbine. This results in an overall plant efficiency somwhat less than would be obtained if higher temperature motive fluid were attainable. It has also been recognized that the greatest practical reduction in the concentration levels of oxides of sulfur and nitrogen in effluent streams is desirable, and that more compact equipment would be advantageous.

Accordingly, an object of the present invention is to provide an improved combined cycle power plant utilizing a coal fueled pressurized fluidized bed combustor wherein the sensible heat energy and motive power available from the pressurized hot combustion gas discharged from the combustor may be utilized without an extensive, costly, gas cleanup system and without need for costly, corrosion-resistant alloys or special protective cladding of the gas turbine hot gas flow path.

Another object of the invention is to provide a combined cycle power plant having a fluidized bed combustor wherein the fluidized bed is operable at temperatures higher than attainable with atmospheric fluidized bed combustors so that overall efficiency of the plant is increased and emissions of sulfur oxide are minimized.

Yet another object is to provide a more compact arrangement of combined cycle power plant equipment; one in which the bed depth of the fluidized bed combustor is optimized for heat transfer and in which formation of noxious oxide compounds is minimized.

SUMMARY OF THE INVENTION

These and other objects of the invention are attained by providing a fluidized bed combustor in which coal or other carbonaceous fuel is burned at elevated pressure to generate a pressurized combustion gas from which heat is extracted through heat exchanger means to a stream of pressurized air. The heated pressurized air, serving as a clean motive fluid, is expanded through an air turbine connected to drive a power load such as an electrical generator or a gas compressor. The pressurized combustion gas, cooled somewhat by passage through the heat exchanger, or exchangers, requires minimal cleanup prior to its introduction to a second gas expansion turbine powered by combustion gases. Because the combustion gas is substantially cooled and minimally cleaned before passage through the combustion gas turbine, problems due to hot gas corrosion, erosion and fouling within the turbine are avoided. The air turbine and combustion gas turbines may be tandemly coupled and may drive both a dynamoelectric machine and a compressor for supplying the pressurized air. A bed of sulfur-sorbing particles and particulate coal is included in the fluidized bed combustor, and in operation the bed is fluidized by a stream of pressurized air from the compressor so that pressure interanl to the combustor, is greater than atmospheric pressure. By means of heat exchangers within the fluidized bed combustor, steam is produced for operation of the steam turbine which may also be connected to drive a second electrical generator.

BRIEF DESCRIPTION OF THE DRAWINGS

While the specification concludes with claims particularly pointing out and distinctly claiming the subject matter regarded as the invention, the invention will be better understood from the following description taken in connection with the accompanying drawings in which:

DETAILED DESCRIPTION OF THE INVENTION

Figure 1:
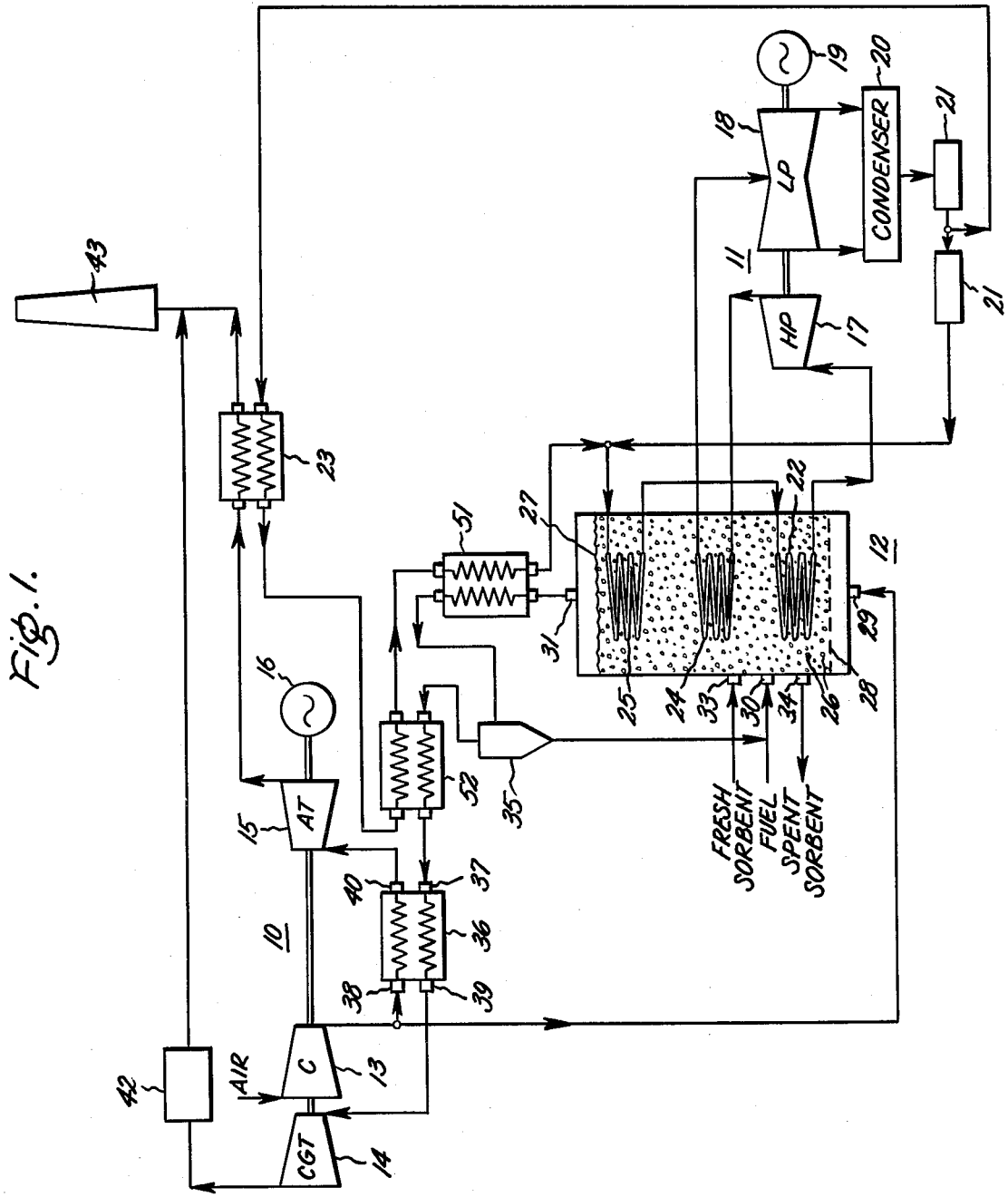
FIG. 1 is a simplified schematic of one embodiment of the combined cycle power plant according to the present invention.

In a preferred embodiment of the invention as shown in FIG. 1, a gas turbine unit 10 is combined with a steam turbine 11, with heat energy for driving both turbines provided by fluidized bed combustor 12.

Gas turbine unit 10, comprising a compressor section 13, a combustion gas turbine section 14, and an air turbine section 15, is connected in driving relationship to load 16 which may be an electrical generator. The steam turbine 11, shown in a form representing only one of several configurations which can be utilized, comprises a high-pressure section 17 and a low-pressure section 18 and is connected in a driving relationship to a second load 19 which may also be an electrical generator. In order to generate steam for driving the steam turbine 11, condensate from the condenser 20 is heated in feedwater heaters 21, then passed through heat exchangers 25 and 22 in the fluidized bed combustor 12 where steam for the high-pressure section 17 is produced. An economizer 23 may be included for additional preheating of a portion of the feedwater and for cooling of exhaust gases from air turbine 15. Heat extracted through economizers 51 and 52 also preheats the feedwater prior to its passage to in-bed heat exchangers 22 and 25, although heat exchangers 51 and 52 are included principally to reduce the temperature of the combustion gas from fluidized bed combustor 12 sufficiently to allow the economical application of materials of construction for cleanup device 35 and heat exchanger 36. Economizers 51 and 52 are hereinafter more fully described. Feedwater flow through economizers 51 and 52 may be as shown, or may be in a parallel-series flow arrangement with economizer 23. Heat exchanger 24 in the fluidized bed combustor 12 is provided for reheating steam for the low-pressure section 18 of the steam turbine 11. The location of the heat exchanger surfaces shown in fluidized bed combustor 12 is schematic only, since in practice some of this surface may be physically located in the combustor walls.

The fluidized bed combustor 12 includes a plurality of sulfur-sorbing particles 26 forming a fluidized bed 27 which is suspended above a perforated distributor plate 28 by a stream of pressurized air taken from compressor 13 and passing into combustor 12. The sulfur-sorbing particles 26 are preferably calcined limestone (calcium carbonate) or dolomite (calcium magnesium carbonate) typically $\frac{1}{8}$ to $\frac{1}{4}$ inch in maximum dimension. These particles capture sulfur oxides during combustion of coal or other carbonaceous fuel and also promote heat transfer. The fluidized bed combustor 12 also includes a first inlet 29 for receiving the above-mentioned stream of pressurized air from the compressor to fluidize the bed 27, support combustion, and pressurize the combustor 12. A second inlet 30 is included for receiving carbonaceous fuel such as coal, and outlet 31 is provided for discharge of combustion gases and other exhaust products such as entrained particulates. Fresh sulfur-sorbing particles 26 are supplied to the fluidized bed combustor 12 through a third inlet 33, and spent sorbing particles and ash solids are removed through exit port 34. The percentage of coal in the bed 27 is typically rather small and is supplied to the bed preferably in the form of particles $\frac{1}{4}$ inch or less in size.

Removal of particulate matter from the combustion gas exhausted from the fluidized bed combustor 12 is accomplished by particulate separator 35, which may be a single or multiple stage cyclone or other separator type of device. Ash, unburned char, and other separated particulates are recyclable to the combustor 12 to utilize any unburned carbon and may, for example, be refed to combustor 12 along with fuel through fuel inlet 30.

The hot combustion gas, relatively free of particulate matter, passes from the particulate separator 35 via economizer 52 to heat exchanger 36 which has, in addition to a first inlet 37 for receiving the combustion gas, a second inlet 38 for receiving a stream of pressurized air from the compressor 13, a first outlet 39 for discharging the combustion gas, and a second outlet 40 for discharging the pressurized air stream. The second outlet 40 is fluidly connected to convey the pressurized air stream passing from the heat exchanger 36 to the air turbine section 15. Heat exchanger 36 provides for transfer of heat energy from the combustion gas stream to the pressurized air stream, so that expansion of the air through air turbine 15 provides energy to drive turbine 15. As noted earlier, hot combustion gas leaving combustor 12 is cooled somewhat in economizer 51 prior to particulate separation. Similarly, economizer 52 is provided downstream of particle separator 35 to adjust the temperature of the combustion gas entering heat exchanger 36. However, it will be recognized that the power generated in air turbine 15 will be greatest when its inlet air temperature is highest, so that in one embodiment of the invention, economizers 51 and 52 may be omitted. They are shown herein to illustrate that the invention may be practiced utilizing economical and readily available materials of construction for separator 35 and heat exchanger 36 by providing, in certain instances, temperature conditioning of the combustion gas prior to the passage through these devices.

The pressurized combustion gas, considerably cooled by its loss of heat in heat exchanger 36, is discharged from the first outlet 39 into the combustion gas turbine 14, providing motive fluid therefor. The combustion gas entering turbine 14 is sufficiently cool and clean so that turbine problems caused by hot gas corrosion, erosion, and fouling are avoided.

Gas exhausted from combustion gas turbine 14 passes through a final cleanup device 42—which may be a fabric filter or other gas cleaning means—to the stack 43. The stack 43 also receives the exhausted gas from air turbine 15 after it has passed through economizer heat exchanger 23.

OPERATION

Operation of the improved combined cycle power plant of FIG. 1 is as follows. Compressor 13 takes in a supply of air and provides, at its output, first and second streams of pressurized air. The first air stream is passed through inlet 29 into the combustor 12 where it provides fluidization to the bed 27, combustion air, and pressurization internal to the combustor 12. Particulate coal (or other carbonaceous fuel) is also supplied to the combustor 12, being brought in through inlet 30. The coal is burned in the combustor 12 to generate the heat energy necessary for driving both the gas turbine unit 10 and the steam turbine 11. Combustion takes place in the presence of sulfur-sorbing particles 26 of the type described above so that oxides of sulfur generated by the combustion process are captured and retained.

Operation of the fluidized bed 27 under elevated pressure conditions enhances the sulfur-sorption mechanism, resulting in a greater reduction of sulfur oxides in the combustion gas emitted from the combustor 12 as compared with a fluidized bed combustor operating substantially at atmospheric pressure. Furthermore, the maximum temperature at which fluidized bed 27 can be operated with effective sulfur sorption is substantially increased (e.g., 1750° F. pressurized vs. 1600° F. atmospheric). The higher pressure also allows the combustor 12 to be more compactly sized but yet have a greater bed depth, which provides a longer residence time for combustion gases therein and which, with a greater mass of sulfur-sorption particles and the greater chance of contact between sorption particles and sulfur compounds, also increases sulfur removal efficiency. The chemical transformations and reactivity of the sulfur-sorbing particles in removing the sulfur compounds is more fully detailed in the above-mentioned patent, U.S. Pat. No. 4,116,005, the disclosure of which is incorporated herein by reference thereto.

Combustion gas from the fluidized bed 27 is exhausted through outlet 31, passing thereby to particulate separator 35 which removes most of the entrained solid matter to pass a clean high-temperature gas to heat exchanger 36. Economizers 51 and 52, disposed in the combustion gas flow path, respectively, before and after the particulate separator 35, allow temperature control of the combustion gas as necessary for highest overall economy and reliability with some minor sacrifice in overall cycle efficiency. Within heat exchanger 36, heat energy is transferred from the combustion gas stream to the second stream of pressurized air which is expanded through air turbine 15 providing motive power thereto. Since the fluidized bed combustor 12 is operating under pressure, the combustion gas therefrom can be hotter than that from a fluidized bed combustor operating at substantially atmospheric pressure (approximately 1600° F. vs. 1750° F.). This permits the second air stream to be heated to a temperature closer to conventional gas turbine firing temperatures so that the air turbine 15 is more efficiently operated, contributing to an improvement in overall plant efficiency.

The combustion gas turbine 14 accepts the relatively cool pressurized combustion gas from heat exchanger 36 at a temperature level well below that at which the sulfidation and corrosion reaction rates are significant (1000°–1200° F.) and expands this gas to near atmospheric pressure thereby recovering its available energy. The need for extensive, costly hot combustion gas cleanup equipment to protect the turbine is therefore obviated. However, further cleanup of the combustion gas in particulate separator means 42 is utilized to insure environmental acceptability before discharge through stack 43.

The steam cycle portion of the power plant operates on essentially a closed cycle which may be described as beginning with condensate in the condenser 20. Feedwater from the condenser 20 passes through feedwater heaters 21 (where it is heated in a well-known manner by steam extracted at various pressure levels from steam turbine 11), and in part through economizer 23 for preheating. Feedwater flow through economizers 51 and 52 allows also for tempering and controlling the temperature of the combustion gases as previously noted. Heated feedwater enters the fluidized bed combustor 12 where steam for the steam turbine high-pressure section 17 is generated in heat exchangers 22 and 25. After expansion through the high-pressure section 17, steam is reheated in heat exchanger 24 before expansion through the low-pressure section 18, thus driving the steam turbine 11 and associated load 19.

By way of example, and considering only the gas turbine portion of the plant, typical conditions are such that compressor section 13 operates at a pressure ratio of approximately 10 to 1 supplying pressurized air at about 600° F.; the operating temperature of the fluidized bed combustor is approximately 1750° F., producing a combustion gas discharged from the combustor 12 having essentially the same temperature (i.e., combustion of volatiles and entrained char above the bed minimized); the stream of pressurized air to air turbine 15 is heated to 1500° F. or higher through heat exchanger 36; and the temperature of the combustion gas is lowered to about 800° F. prior to passage through the combustion gas turbine 14. Overall thermal efficiency for the combined cycle power plant under these conditions is estimated at about 40.2 percent, about 5–6 percentage points higher than a conventional steam cycle plant operating under similar steam conditions and about one percentage point higher than a combined cycle power plant having an atmospheric fluidized bed combustor.

Figure 2:
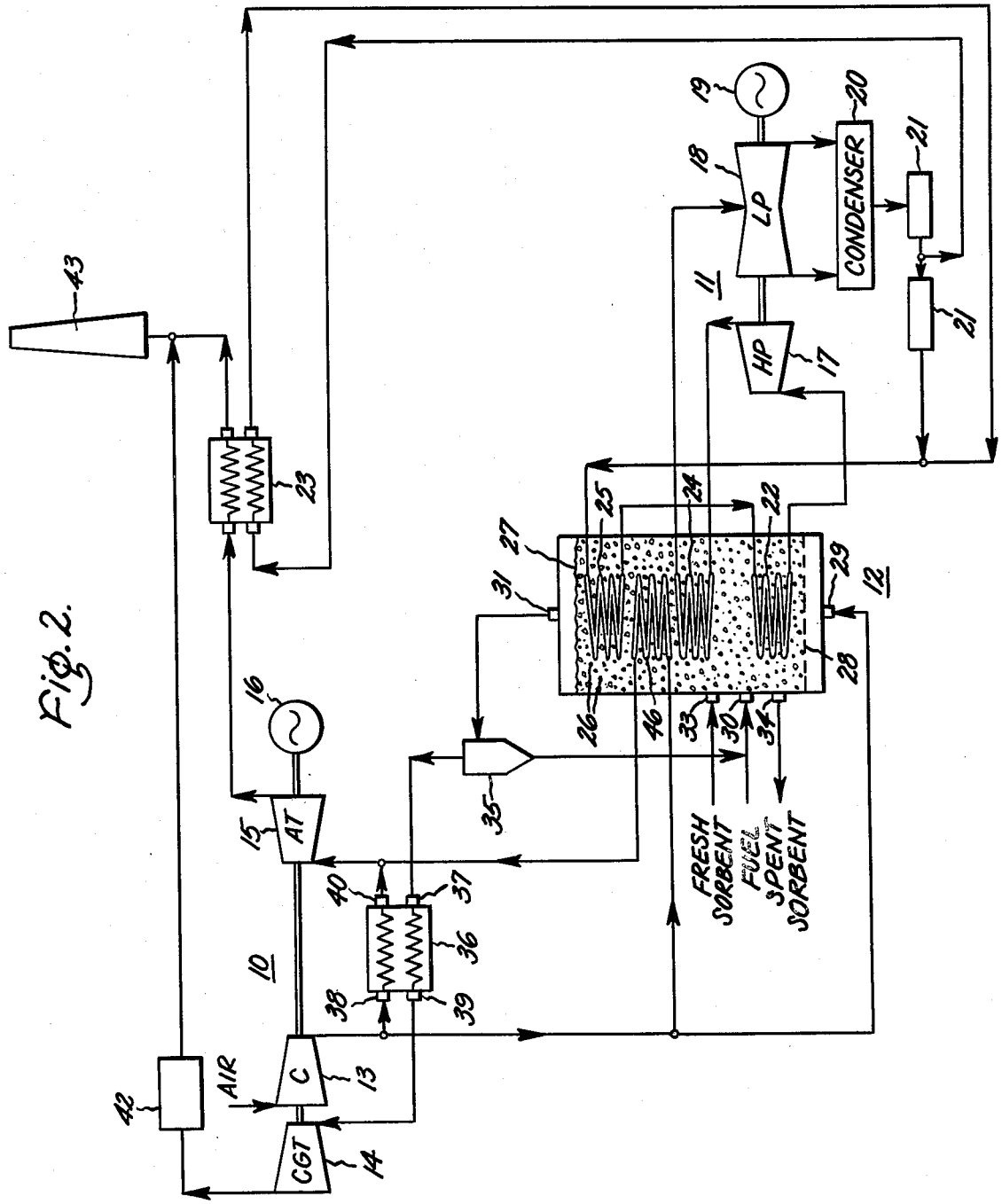
FIG. 2 is a schematic of a modification of the power plant of FIG. 1 showing the inclusion of a parallel-connected air heat exchanger within the fluidized bed.

A slightly modified combined cycle power plant in accord with the present invention is shown in FIG. 2. Economizers 51 and 52 for tempering the combustion gas temperature are omitted for clarity in this description. In this embodiment, a third stream of pressurized air is taken from the compressor, passed through an auxiliary in-bed heat exchanger 46 and then is merged with the second stream of pressurized air as it comes from heat exchanger 36. The combined, heated air stream passes into and drives air turbine 15. The added in-bed heater 46 and split air flow permits the percentage of compressor mass flow taken by the air turbine 15 to be selected over a broader range, allowing greater flexibility in determining the optimum ratio of gas turbine power to steam turbine power to maximize overall plant efficiency. Additionally, the in-bed heater 46 increases the temperature of the air deliverable to the air turbine 15 so that overall plant efficiency is further increased. These results are of additional benefit since they permit the plant power rating and cost to be optimized.

Figure 3:
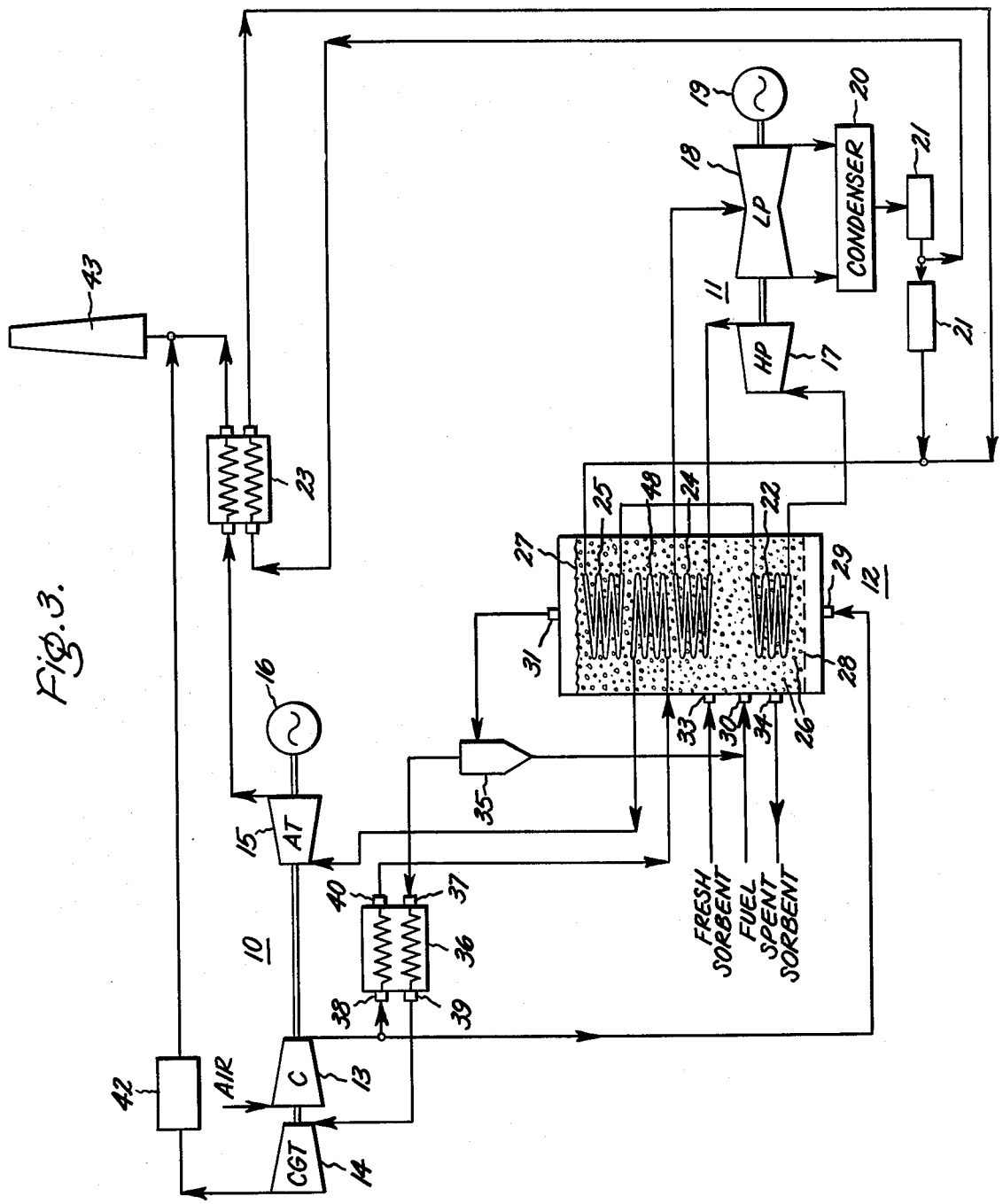
FIG. 3 is a schematic of another modification of the power plant of FIG. 1 showing the inclusion of a series-connected air heat exchanger within the fluidized bed.

FIG. 3 shows yet another embodiment of the invention wherein an auxiliary in-bed heat exchanger 48 is connected in the flow path of the second stream of pressurized air between the heat exchanger 36 and the air turbine 15. This configuration boosts the inlet temperature of air turbine 15 and permits a wider selection of the ratio of gas turbine to steam turbine power and provides the operational advantages inherent in the embodiment of FIG. 2.

It will be recognized that an improved combined cycle power plant has been described in which a pressurized fluidized bed combustor is advantageously utilized to supply heat energy to thermodynamically coupled steam and gas turbine cycles; that the power plant may be fueled by sulfur-bearing coal; that hot corrosion problems in the gas turbine are avoided; that extensive and costly cleanup of the hot combustion gas is unnecessary; that higher overall efficiency is attained through gains in the efficiency of the gas turbine portion of the system; and that excessive emission of atmospheric pollutants is avoided.

While there has been shown and described what is considered a preferred embodiment of the invention, it is understood that various other modifications may be made therein. For example, the stream of pressurized air supplied to the fluidized bed combustor may be preheated by the inclusion of a heat exchanger which transfers heat from the combustion gas stream to the air stream. Such a heat exchanger may be added to preheat either the entire stream of air from the compressor or may be limited to preheat only that passing to the fluidized bed combustor. In addition, the air turbine and combustion gas turbine elements can be mounted on separate shafts or in dual spool arrangements with the compressor or driven load elements in a manner well known to those skilled in the art. It is intended to claim all such modifications which fall within the true spirit and scope of the present invention.

What is claimed is:

1. A combined cycle power plant, comprising:
   (a) a gas turbine portion including a combustion gas turbine section, an air turbine section, and a compressor section, said compressor section adapted to supply first and second streams of pressurized air;
   (b) a pressurized fluidized bed combustor for combustion of carbonaceous fuel, said combustor having a bed of fluidizable sulfur-sorbing particles and carbonaceous fuel particles, a first inlet for receiving said first stream of pressurized air, a second inlet for receiving carbonaceous fuel, a third inlet for receiving sulfur-sorbing particles, a first outlet for discharging a stream of pressurized combustion gas and particulates entrained therein, and a second outlet for discharging spent sorbing particles and ash solids;
   (c) means for removal of particulates from said stream of combustion gas, said removal means having an inlet for receiving said combustion gas and entrained particulates from said fluidized bed combustor, and an outlet for discharging said combustion gas;
   (d) a first heat exchanger for transferring heat energy from said combustion gas stream to said second stream of pressurized air, said heat exchanger having a first inlet for receiving said combustion gas stream from said particulate removal means, a second inlet for receiving said second stream of pressurized air, a first outlet fluidly connected to said combustion gas turbine for discharging said combustion gas stream thereto as motive fluid therefor, and a second outlet fluidly connected to said air turbine for discharging said second stream of pressurized air thereto as motive fluid therefor;
   (e) a steam turbine; and
   (f) steam generating means in said fluidized bed combustor for furnishing steam to drive said steam turbine.

2. The combined cycle power plant of claim 1 further including:
   an auxiliary heat exchanger within said fluidized bed combustor for transferring heat energy from said fluidized bed combustor to a third stream of pressurized air supplied by said compressor, said auxiliary heat exchanger being fluidly connected to discharge said third stream of pressurized air so that it merges with said second stream of pressurized air to provide air as motive fluid for said air turbine.

3. The combined cycle power plant of claim 1 further including:
   an auxiliary heat exchanger within said fluidized bed combustor for transferring heat energy from said fluidized bed combustor to said second stream of pressurized air, said auxiliary heat exchanger being fluidly interposed between said second outlet of said first heat exchanger and said air turbine to provide a higher temperature motive fluid for said air turbine.

4. The combined cycle power plant of claims 1, 2, or 3 further including:
   a first economizer heat exchanger for tempering and controlling the temperature of said combustion gas stream passing to said particulate removal means from said fluidized bed combustor, said first economizer adapted to transfer heat energy from said combustion gas stream to a feedwater stream for said steam turbine, said first economizer having a first inlet for receiving said combustion gas stream from said fluidized bed, a second inlet for receiving said feedwater stream, a first outlet for discharging said combustion gas stream to said particulate removal means, and a second outlet for discharging said feedwater stream.

5. The combined cycle power plant of claim 4 further including:
   a second economizer heat exchanger for tempering and controlling the temperature of said combustion gas stream passing to said first heat exchanger from said particulate removal means, said second economizer adapted to transfer heat energy from said combustion gas stream to said feedwater stream, said second economizer having a first inlet for receiving said combustion gas stream from said particulate removal means, a second inlet for receiving said feedwater stream, a first outlet for discharging said combustion gas stream to said first heat exchanger, and a second outlet for discharging said feedwater stream.

6. A combined cycle power plant according to claim 5 wherein the fluidizable sulfur-sorbing particles of said fluidized bed combustor are selected from the group consisting of calcined or partially calcined dolomite and limestone.

7. A combined cycle power plant according to claims 1, 2, or 3 wherein the carbonaceous fuel utilized in the fluidized bed combustor is coal in particulate form.

8. A combined cycle power plant according to claims 1, 2, or 3 further including a first dynamoelectric machine connected to and driven by said gas turbine unit and a second dynamoelectric machine connected to and driven by said steam turbine.

9. A combined cycle power plant according to claims 1, 2, or 3 wherein the fluidizable sulfur-sorbing particles of said fluidized bed combustor are selected from the group consisting of calcined or partially calcined dolomite and limestone.

* * * * *